United States Patent [19]

Rooney

[11] Patent Number: 4,519,907
[45] Date of Patent: May 28, 1985

[54] GRIT SETTLING BASIN INCLUDING VANE PUMP

[75] Inventor: Thomas C. Rooney, Waukesha, Wis.

[73] Assignee: Rexnord Inc., Brookfield, Wis.

[21] Appl. No.: 562,649

[22] Filed: Dec. 19, 1983

[51] Int. Cl.³ .................... B01D 21/18; B01D 21/10; B03D 1/14
[52] U.S. Cl. .................... 210/257.1; 210/532.1; 210/523; 209/172.5; 209/169
[58] Field of Search .................... 210/257.1, 262, 319, 210/320, 519, 523, 525, 532.1, 801, 208; 209/172.5, 173, 168, 169

[56] References Cited

U.S. PATENT DOCUMENTS

| | | |
|---|---|---|
| 1,815,159 | 7/1931 | Nordell . |
| 2,202,475 | 5/1940 | Wileman . |
| 2,308,670 | 1/1943 | Bolton . |
| 2,360,551 | 10/1944 | Durdin . |
| 2,419,004 | 4/1947 | Bieker . |
| 2,425,932 | 8/1947 | Green . |
| 2,987,185 | 6/1961 | Feeney . |
| 3,071,447 | 1/1963 | Bernhardi ............... 209/169 |
| 3,210,053 | 10/1965 | Boester . |
| 3,313,725 | 4/1967 | Tsuda et al. ............ 210/208 |
| 3,353,676 | 10/1967 | Hirsch ..................... 210/519 |
| 3,567,633 | 3/1971 | Valdespino . |
| 3,630,372 | 12/1971 | Weir . |
| 3,695,439 | 10/1972 | Dupre . |
| 3,837,493 | 9/1974 | Lin . |
| 3,865,721 | 2/1975 | Kaelin . |
| 3,941,698 | 3/1976 | Weis ....................... 210/257.1 |
| 4,107,038 | 8/1978 | Weis ....................... 210/801 |
| 4,330,401 | 5/1982 | Boze et al. .............. 210/268 |
| 4,357,244 | 11/1982 | Bose ........................ 210/801 |
| 4,406,789 | 9/1983 | Brignon ................. 210/532.1 |

FOREIGN PATENT DOCUMENTS

| | | | |
|---|---|---|---|
| 546334 | 2/1932 | Fed. Rep. of Germany ...... 210/519 |
| 566499 | 12/1932 | Fed. Rep. of Germany ...... 210/519 |
| 920179 | 6/1955 | Fed. Rep. of Germany ...... 210/519 |
| 1066997 | 10/1959 | Fed. Rep. of Germany ...... 210/519 |
| 316073 | 10/1956 | Switzerland ..................... 210/523 |
| 830531 | 3/1960 | United Kingdom . |

OTHER PUBLICATIONS

Journal WPCF-vol. 46, No. 7, Jul. 1974.

Primary Examiner—Barry S. Richman
Assistant Examiner—Titus B. Ledbetter, Jr.
Attorney, Agent, or Firm—Richard C. Ruppin

[57] ABSTRACT

A grit settling basin including a cylindrical grit settling chamber adapted to contain liquid sewage and a grit storage chamber positioned beneath the grit settling chamber and adapted to receive grit settling out of the liquid. A vertical shaft is positioned centrally in the grit settling basin and extends into the grit storage chamber. A partition comprising a truncated cone surrounds the central shaft and defines the two chambers. A first annular opening is provided between the shaft and the partition and a second annular opening is provided between the partition and an upper portion of the grit storage chamber. A plurality of vanes project from the central shaft below and adjacent the partition and cause upward fluid flow through the first annular opening in response to rotation of the shaft.

8 Claims, 3 Drawing Figures

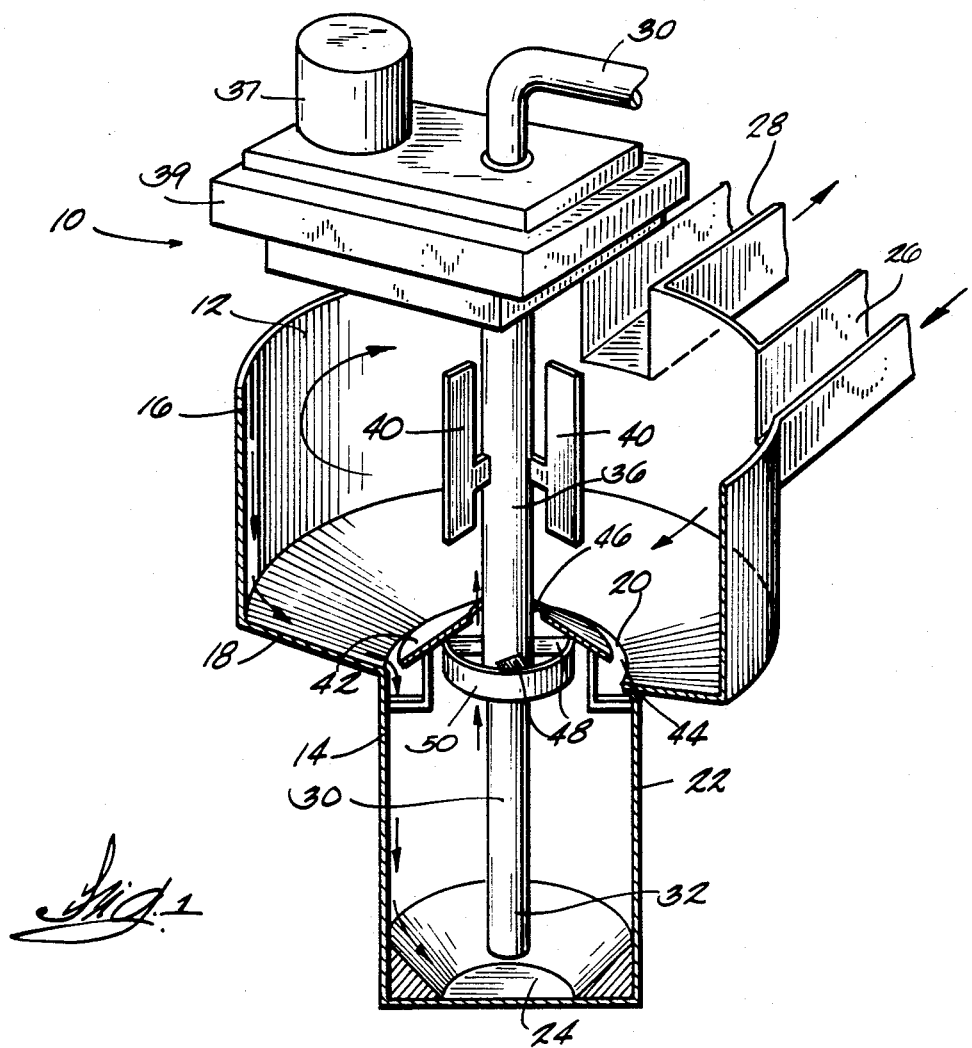
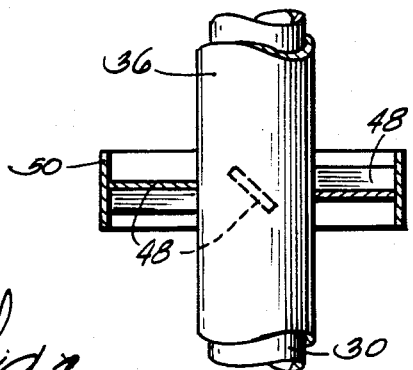
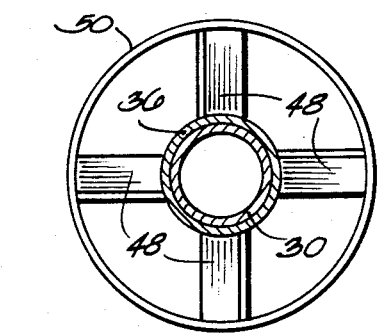

GRIT SETTLING BASIN INCLUDING VANE PUMP

FIELD OF THE INVENTION

The present invention relates to apparatus for use in treating sewage and more particularly to grit settling basins for use in removing grit materials from liquid sewage.

BACKGROUND PRIOR ART

In apparatus for use in treating sewage, one of the primary or initial treatment steps requires separating grit materials from the liquid and organic materials. These grit materials suspended in the liquid sewage are one of the most difficult materials to handle and are principally made up of sand, soil and other coarse sediment, including some hard granular organic materials which reach a sewage treatment plant. It is desired that this material be removed during the initial stages of treatment because this material cannot be treated or reduced in size and because it is hard and abrasive and therefore results in wear of pumps and any other mechanical devices used in the waste treatment process.

One form of apparatus for use in separating grit from sewage is illustrated in the Weis U.S. Pat. Nos. 4,107,038 and 3,941,698 and generally comprises a settling bin or tank. Liquid sewage is caused to flow into the tank and around the generally circular tank in a controlled pattern. As the liquid material flows through the tank, the grit material, which has a density greater than that of the other materials, tends to settle to the bottom of the tank. This grit is then pumped out of the tank or otherwise removed.

One of the problems associated with prior art grit settling basins is in relation to the means used for maintaining a proper flow of liquid through the grit settling basin such that organic solids remains suspended in the liquid while the heavier grit material will settle out.

The prior art grit basins commonly comprise a large diameter cylindrical tank positioned over and concentric to a small diameter cylindrical tank. It is intended that the sewage will flow into the large diameter cylindrical tank and the grit material will settle out and fall into the lower small diameter cylindrical tank.

One of the problems which may occur in the prior art constructions is that solid organic material has a tendency to settle into the lower smaller diameter cylindrical tank. This is undesirable in that this material tends to retard the settling of the grit material from the liquid and also tends to clog the lower cylindrical tank. On the other hand, if the velocity of the liquid flow is increased sufficiently to cause the solid organic materials to remain in suspension, the inorganic grit material may not settle out properly and may also remain in suspension in the liquid.

SUMMARY OF THE INVENTION

The present invention provides an improved grit settling basin including an improved means for controlling or causing flow of the liquid material through the grit settling basin in such a manner that the grit material will settle out efficiently while the organic material is maintained in solution and is not allowed to settle into the lower small diameter cylinder or grit collecting cylinder of the grit settling basin.

The grit settling basin embodying the invention includes a cylindrical upper settling chamber adapted to contain liquid. A lower cylindrical grit storage chamber is positioned beneath a central portion of the cylindrical upper settling chamber and is adapted to receive grit which settles out of the liquid.

Referring more specifically to the particular construction of the grit settling basin embodying the invention, that apparatus includes a cylindrical grit settling chamber, and a cylindrical grit storage chamber positioned below the cylindrical grit settling chamber such that grit settlng out of the liquid will settle into the grit storage chamber. A vertical shaft is positioned centrally in the cylindrical grit settling chamber and in the grit storage chamber and is rotatable about its longitudinal axis. A partition surrounds the shaft and separates the cylindrical grit settling chamber and the cylindrical grit storage chamber. The partition has a circular periphery adjacent and spaced inwardly from the wall of the cylindrical grit storage chamber so as to define a first annular opening therebetween. The partition also includes a circular central aperture housing the shaft. The periphery of the aperture being spaced from the shaft so as to define a second annular opening between the shaft and the partition to provide for upward flow or liquid. Means are also provided for causing upward flow of liquid through the annular opening between the partition and the central shaft and downward flow of liquid through the annular opening between the partition and the cylindrical grit storage chamber.

BRIEF DESCRIPTION OF THE DRAWINGS

FIG. 1 is a preferred embodiment of the invention in which the partition slopes upwardly from its peripheral edge toward the central opening. In one embodiment of the invention the vanes are positioned below the partition.

FIG. 2 is a preferred form of the invention in which the means for generating flow through the annular openings includes a plurality of vanes fixed to the central shaft and supported for rotation with the shaft.

FIG. 3 is one embodiment of the invention in which the means for causing vertical flow further includes a circular ring surrounding the vanes, the vanes extending radially outwardly from the shaft and with the radially outward ends of the vanes being fixed to the ring.

DESCRIPTION OF A PREFERRED EMBODIMENT

Illustrated in FIG. 1 is a grit settling apparatus embodying the present invention and including a housing or tank 10 comprised of a cylindrical grit settling chamber 12 and a cylindrical grit storage chamber 14. The grit storage chamber 14 is positioned immediately below the grit settling chamber 12, is smaller in diameter and has a common longitudinal vertical axis with the grit settling chamber 12.

The upper chamber or grit settling chamber 12 is open at the top and has a cylindrical wall 16. In the illustrated construction the floor 18 of the grit settling chamber 12 slopes downwardly toward the central circular opening 20. The central circular opening forms the upper edge of a circular or cylindrical wall 22 of the lower or grit storage chamber 14. The bottom of the grit storage chamber terminates in a flat bottom wall 24. An inlet trough or conduit 26 is provided in fluid communication with the interior of the cylindrical grit settling chamber 12 and generally tangent with the outer periphery or the cylindrical wall 16 of the settling chamber 12. Also included is an outlet trough or conduit 28 provided in fluid communication with the interior of the settling chamber 12, the outlet trough 28 being spaced from the inlet trough by approximately 270° with respect to the direction of circular fluid flow around the cylindrical chamber 12.

The grit settling apparatus of the invention also includes a central vertical pipe 30 extending downwardly through the grit settling cylinder 12 and into the grit storage cylinder 14. The lower end 32 of the vertical pipe 30 is positioned in adjacent spaced relation from the floor 24 of the grit storage cylinder 14. The lower end of the central pipe 30 extends into the bottom of the grit storage cylinder 14 whereby grit settling into the bottom of the grit storage cylinder 14 can be pumped out of the grit storage cylinder for disposal. In one form of the invention the pipe 30 can comprise an air lift discharge pipe of the type described in the U.S. Pat. No. 3,941,698 to Weis and including means for delivering pressurized air to the lower end of the pipe 30 to cause grit to be air lifted up the pipe 30.

Means are also provided for generating a controlled flow of liquid around the cylindrical settling basin at a controlled velocity. In the illustrated construction a sleeve or hollow shaft 36 surrounds the vertical pipe 30 and is coaxial therewith. The shaft 36 is supported such that it is freely rotatable around the longitudinal axis of the shaft 36 and the central pipe 30. A plurality of blades or paddles 40 are fixed to the shaft 36 and extend radially outwardly therefrom. The means for generating controlled flow of liquid further includes means for causing rotation of the shaft 36 and the blades 40 at a controlled speed so as to cause movement of liquid in the grit settling cylinder 12 at a suitable velocity. This means for causing rotation of the shaft 36 can comprise a conventional motor 37 and gear box 39 of conventional construction supported above the cylindrical grit settling chamber 12 and operably connected to the upper end of the shaft 36.

Means are also provided for separating a lower portion of the upper cylinder, i.e., the grit settling chamber 12 and the grit storage cylinder 14. While this means could have other constructions, in the illustrated arrangement it is comprised of a truncated cone-shaped partition 42. While the partition 42 could be constructed of various materials, in one embodiment of the invention it is comprised of a steel plate. The partition 42 is supported adjacent the upper end of the grit storage cylinder 14 such that the lower peripheral edge of the cone is positioned adjacent but spaced from the upper edge of the cylindrical wall 22 so as to define an annular opening 44 between the upper end of the cylindrical wall 22 and the periphery of the partition 42.

The conical partition 42 also surrounds the shaft 36 and is spaced outwardly from the shaft 36 by a distance sufficient to define an annular opening 46 between the shaft 36 and the partition 42.

Means are also provided for generating an upward flow of liquid through the annular opening 46 defined by the partition 42 and the shaft 36. This means for generating an upward flow provides for a controlled flow of liquid upwardly through the annular opening 46. Such upward flow generates a corresponding downward flow of liquid through the annular opening 44, the flow volume through the annular opening 46 being substantially the same as the flow volume downwardly through the annular opening 44.

The means for generating upward flow through the annular opening 46 comprises a plurality of vanes 48 fixed to the central vertically extending shaft 36 and extending radially outwardly therefrom. In the illustrated construction, the vanes 48 are generally planar blades and are disposed at an angle to the horizontal sufficient to generate the fluid flow vertically upwardly in response to rotation of the shaft and consequent movement of the vanes 48 through the liquid. The means for generating upward flow also includes means for reducing the formation of eddy currents at the ends of the vanes as the vanes move through the liquid. In the illustrated arrangement this means comprises a circular band or rim 50 surrounding the vanes 48 such that the radially outer ends of the vanes 48 are fixed to the inner surface of the circular rim 50. While the circular rim 50 could be secured to the vanes 48 in various ways, in the illustrated construction, the outer ends of the vanes 48 are welded to the circular rim 50. The circular rim is positioned such that the it defines a cylinder having a longitudinal axis coextensive with the longitudinal axis of the vertical shaft 36.

In addition, the rim 50 could be stationary and attached to the brackets which support the partition 42, or to the partition 42 itself, and the vanes 48 would rotate within and relative to the rim 50.

In a preferred form of the invention the vanes 48 and the rim 50 are positioned adjacent the partition 42 and immediately below the annular opening 46 and generally in horizontal alignment with the upper end of the grit storage cylinder 14.

In operation of the grit settling apparatus described above, the liquid sewage will flow into the grit settling tank through the conduit 26 and will circulate around the cylindrical tank 12 in a vortex pattern. This flow pattern is generated in part by the orientation of the fluid inlet or conduit 26 such that it is tangential with respect to the periphery of the cylindrical settling tank 12 and further in part by the provision of the paddles 40 attached to the rotating shaft 36. As the liquid moves in a circular pattern through the grit settling chamber 12, the grit will tend to settle out of the liquid and propagate toward the periphery of the cylinder and will then settle downwardly toward the floor 18 of the grit settling cylinder. The grit then propagates along the floor 18 of the grit settling chamber 18 due, in part, to the action of the vortex and will move toward the annular opening 44 into the grit storage tank 14.

Due to the provision of the vanes 48 fixed to the shaft 36, a flow of liquid is generated through the annular opening 46 between the partition 42 and the central sleeve and a complementary downward flow of liquid is caused through the other annular opening 44. This fluid flow through the annular openings 44 and 46 will maintain circulation of liquid through the grit storage tank 14 and prevent the accumulation of organic materials in the grit storage tank 14 and maintain a suspension of organic materials in the liquid. The downward fluid flow through the annular opening 44 also generates and maintains a positive means for causing the grit material to move through the annular opening 44 and enter the grit storage cylinder 14.

In a preferred form of the invention, the annular opening 44 will have a surface area which is greater than the surface area of the annular opening surrounding the shaft 36. Since the volume of the liquid flow upwardly through the annular opening 46 adjacent the sleeve must be equal to the volume of flow downwardly through the other annular opening 44, if the annular opening 44 is larger in surface area than annular opening 46, the liquid flowing through annular opening 44 will have a lesser velocity. The higher velocity upward fluid flow through annular opening 46 will ensure flow of the lighter organic materials out of the settling chamber 14, while the fluid flow velocity through annular opening 44 will be sufficiently low that grit in the chamber 14 is allowed to settle.

Control of the velocity of fluid flow through the annular openings 44 and 46 is controlled by varying the size of the openings, controlling the shape of the truncated partition 42, controlling the number and type of the vanes 48 and by varying the speed of rotation of the hollow shaft 36. By varying these factors, it is possible to control the flow of liquid in the grit storage cylinder 14 so as to insure a flow rate through the grit settling chamber 12 suffcient that the organic materials can be maintained in suspension while at a low enough velocity that the grit material will settle out of the liquid.

Various features of the invention are set forth in the following claims.

It is claimed:

1. Apparatus for separating grit from liquid sewage while retaining organic solids in suspension including inlet means for admitting liquid sewage into the apparatus, outlet means for removing liquid from which grit has been separated from the apparatus, and means for removing separated grit from the apparatus, the apparatus further comprising:
   a cylindrical grit settling chamber,
   a cylindrical grit storage chamber positioned below the cylindrical grit settling chamber such that grit settling out of said liquid will settle into said grit storage chamber, said cylindrical grit storage chamber including a circular wall having an upper edge,
   a vertical shaft positioned centrally in said cylindrical grit settling chamber and in said grit storage chamber, said shaft having a longitudinal axis,
   means for causing rotation of said central shaft about said longitudinal axis,
   a partition surrounding said shaft and separating said cylindrical grit settling chamber and said cylindrical grit storage chamber, said partition having a circular peripheral edge adjacent and spaced inwardly from said circular wall of said cylindrical grit storage chamber, said peripheral edge and said circular wall being spaced so as to define a first annular opening therebetween, and said partition including a circular central aperture housing said shaft, said circular aperture being spaced from said shaft to define a second annular opening between said shaft and said partition to provide for upward flow of liquid, and
   mechanical means positioned within the storage chamber for causing vertical upward flow of liquid through said second annular opening and vertical downward flow of said liquid through said first annular opening.

2. Apparatus as set forth in claim 1 wherein said partition slopes upwardly from said peripheral edge toward said circular aperture.

3. Apparatus as set forth in claim 1 wherein said mechanical means for causing vertical flow includes a plurality of vanes fixed to said shaft and rotatable with said shaft.

4. Apparatus as set forth in claim 3 wherein said vanes are positioned below said partition and adjacent said second annular opening.

5. Apparatus as set forth in claim 3 wherein said means for causing vertical flow further includes a circular rim surrounding said vanes, said vanes extending radially outwardly from said shaft, each of said vanes including a radially outward end, said radially outward ends of said vanes being fixed to said rim.

6. Apparatus as set forth in claim 1 wherein the grit settling chamber includes a cylindrical wall and a settling floor having an outer peripheral edge connected to the bottom of the cylindrical wall and an inner peripheral edge extending to the first annular opening, the inner peripheral edge of the settling floor being spaced from the second annular opening whereby grit and organic solids contained in liquid sewage and settled on said floor may move downward through the first annular opening in response to the means for causing vertical flow of the liquid.

7. Apparatus as set forth in claims 1, 2, 3, 4, 5 or 6 wherein said first annular opening has a larger cross section area than the second annular opening whereby the velocity of the liquid flow caused by the means for causing vertical flow of liquid is lower through the first annular opening than through the second annular opening.

8. Apparatus for separating grit from liquid sewage while retaining organic solids in suspension including inlet means for admitting liquid sewage into the apparatus, outlet means for removing liquid from which grit has been separated from the apparatus, and means for removing separated grit from the apparatus, the apparatus further comprising
   a cylindrical grit settling chamber,
   a cylindrical grit storage chamber positioned below the cylindrical grit settling chamber such that grit settling out of said liquid will settle into said grit storage chamber, said cylindrical grit storage chamber including a circular wall having an upper edge,
   a vertical shaft positioned centrally in said cylindrical grit settling chamber and in said grit storage chamber, said shaft having a longitudinal axis,
   means for causing rotation of said central shaft about said longitudinal axis,
   a partition surrounding said shaft and separating said cylindrical grit settling chamber and said cylindrical grit storage chamber, said partition having a circular peripheral edge adjacent and spaced inwardly from said circular wall of said cylindrical grit storage chamber, said peripheral edge and said circular wall being spaced so as to define a first annular opening therebetween, and said partition includng a circular central aperture housing said shaft, said circular aperture being spaced from said shaft to define a second annular opening between said shaft and said partition to provide for upward flow of liquid, and
   means positioned within the storage chamber for causing upward flow of liquid through said second annular opening and downward flow of said liquid through said first annular opening, said means for causing upward flow including a plurality of vanes fixed to said shaft and rotatable with said shaft, said vanes extending radially outwardly from said shaft and including radially outer ends and being positioned adjacent said second annular opening, and a circular rim surrounding said vanes, said rim being fixed to said radially outer ends of said vanes.

* * * * *